(12) United States Patent
Casu et al.

(10) Patent No.: US 9,097,127 B2
(45) Date of Patent: Aug. 4, 2015

(54) POROUS LAYER SYSTEM HAVING A POROUS INNER LAYER

(75) Inventors: Alessandro Casu, Duisburg (DE); Christian Menke, Essen (DE); Thomas Neuenhahn, Köln (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 205 days.

(21) Appl. No.: 13/882,763

(22) PCT Filed: Oct. 19, 2011

(86) PCT No.: PCT/EP2011/068224
§ 371 (c)(1),
(2), (4) Date: Jun. 18, 2013

(87) PCT Pub. No.: WO2012/062546
PCT Pub. Date: May 18, 2012

(65) Prior Publication Data
US 2013/0330538 A1 Dec. 12, 2013

(30) Foreign Application Priority Data
Nov. 9, 2010 (EP) ..................... 10190473

(51) Int. Cl.
*B32B 9/00* (2006.01)
*B32B 3/00* (2006.01)
*B32B 15/04* (2006.01)
*B32B 19/00* (2006.01)
*F01D 5/28* (2006.01)
*C23C 28/04* (2006.01)
*C23C 28/00* (2006.01)

(52) U.S. Cl.
CPC .............. *F01D 5/282* (2013.01); *C23C 28/042* (2013.01); *C23C 28/048* (2013.01); *C23C 28/321* (2013.01); *C23C 28/325* (2013.01); *C23C 28/3215* (2013.01); *C23C 28/345* (2013.01); *C23C 28/3455* (2013.01); *Y02T 50/67* (2013.01)

(58) Field of Classification Search
CPC .. C23C 28/042; C23C 28/048; C23C 28/325; F01D 5/284; F01D 5/288
USPC ....... 416/241 B, 241 R; 428/312.8, 469, 472, 428/702
See application file for complete search history.

(56) References Cited

U.S. PATENT DOCUMENTS

2009/0017260 A1* 1/2009 Kulkarni et al. .............. 428/161
2009/0311508 A1* 12/2009 Stamm ........................ 428/316.6
2012/0003460 A1* 1/2012 Stamm .......................... 428/220

FOREIGN PATENT DOCUMENTS

EP        2230329 A1 *  9/2010  .............. C23C 28/00

* cited by examiner

*Primary Examiner* — Jonathan Langman

(57) ABSTRACT

A layer system with ceramic layers includes a substrate, a MCrAl(X) layer, which has an oxide layer on the substrate, a lowermost ceramic layer, an outer pyrochlore layer, and a central ceramic layer. The central ceramic layer has a higher porosity at least partially than the outer pyrochlore layer.

11 Claims, 4 Drawing Sheets

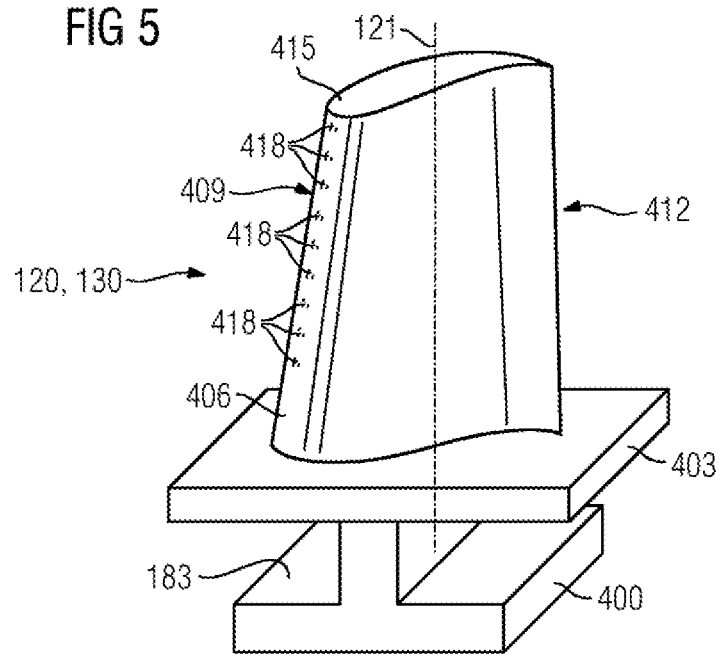
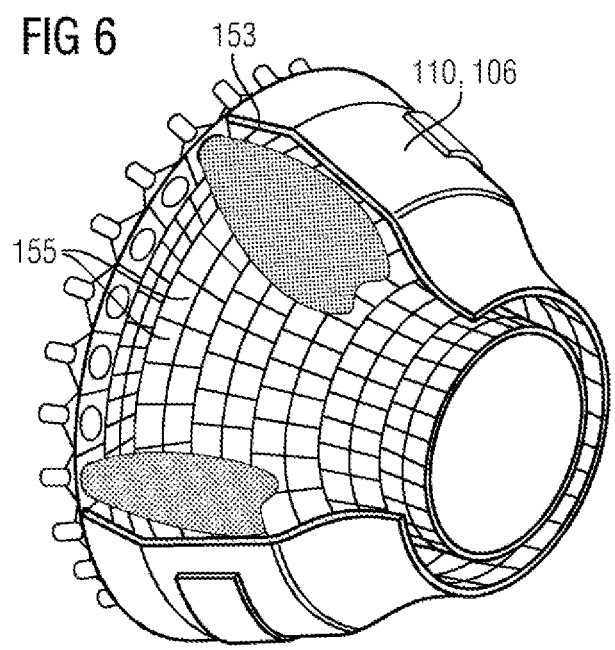

FIG 7

| Material | C | Cr | Ni | Co | Mo | W | Ta | Nb | Al | Ti | B | Zr | Hf |
|---|---|---|---|---|---|---|---|---|---|---|---|---|---|
| Ni-based investment casting alloys | | | | | | | | | | | | | |
| GTD 222 | 0.10 | 22.5 | Remainder | 19.0 | | 2.0 | 1.0 | | 1.2 | 2.3 | 0.008 | | |
| IN 939 | 0.15 | 22.4 | Remainder | 19.0 | | 2.0 | 1.4 | 1.0 | 1.9 | 3.7 | 0.009 | 0.10 | |
| IN 6203 DS | 0.15 | 22.0 | Remainder | 19.0 | | 2.0 | 1.1 | 0.8 | 2.3 | 3.5 | 0.010 | 0.10 | 0.75 |
| Udimet 500 | 0.10 | 18.0 | Remainder | 18.5 | 4.0 | | | | 2.9 | 2.9 | 0.006 | 0.05 | |
| IN 738 LC | 0.10 | 16.0 | Remainder | 8.5 | 1.7 | 2.6 | 1.7 | 0.9 | 3.4 | 3.4 | 0.010 | 0.10 | |
| SC 16 | <0.01 | 16.0 | Remainder | | 3.0 | | 3.5 | | 3.5 | 3.5 | <0.005 | <0.008 | |
| Rene 80 | 0.17 | 14.0 | Remainder | 9.5 | 4.0 | 4.0 | | | 3.0 | 5.0 | 0.015 | 0.03 | |
| GTD 111 | 0.10 | 14.0 | Remainder | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Remainder | 9.0 | 1.9 | 4.1 | 4.1 | | 3.4 | 3.8 | 0.015 | 0.02 | |
| IN 792 DS | 0.08 | 12.5 | Remainder | 9.0 | 1.9 | 4.1 | 4.1 | | 3.4 | 3.8 | 0.015 | 0.02 | 1.00 |
| MAR M 002 | 0.15 | 9.0 | Remainder | 10.0 | | 10.0 | 2.5 | | 5.5 | 1.5 | 0.015 | 0.05 | 1.50 |
| MAR M 247 LC DS | 0.07 | 8.1 | Remainder | 9.2 | 0.5 | 9.5 | 3.2 | | 5.6 | 0.7 | 0.015 | 0.02 | 1.40 |
| CMSX-2 | <.006 | 8.0 | Remainder | 4.6 | 0.6 | 8.0 | 6.0 | | 5.6 | 1.0 | <.003 | <.0075 | 0.10 |
| CMSX-3 | <.006 | 8.0 | Remainder | 4.6 | 0.6 | 8.0 | 6.0 | | 5.6 | 1.0 | <.003 | <.0075 | 0.10 |
| CMSX-4 | | 6.0 | Remainder | 10.0 | 0.6 | 6.0 | 6.0 | | 5.6 | 1.0 | | Re=3.0 | 0.10 |
| CMSX-6 | <.015 | 10.0 | Remainder | 5.0 | 3.0 | <.10 | 2.0 | <.10 | 4.9 | 4.8 | <.003 | <.0075 | 0.10 |
| PWA 1480 SX | <.006 | 10.0 | Remainder | 5.0 | | 4.0 | 12.0 | | 5.0 | 1.5 | <.0075 | <.0075 | |
| PWA 1483 SX | 0.07 | 12.2 | Remainder | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Remainder | | 7.5 | | | | | 0.010 | | |
| X 45 | 0.25 | 25.0 | 10 | Remainder | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M 509 | 0.65 | 24.5 | 11 | Remainder | | 7.5 | 4 | | | 0.3 | 0.010 | 0.60 | |
| CM 247 | 0.07 | 8.3 | Remainder | 10.0 | 0.5 | 9.5 | 3.2 | | 5.5 | 0.7 | | | 1.5 |

Chemical composition in %

POROUS LAYER SYSTEM HAVING A POROUS INNER LAYER

CROSS REFERENCE TO RELATED APPLICATIONS

This application is the US National Stage of International Application No. PCT/EP2011/068224 filed Oct. 19, 2011, and claims benefit thereof, the entire content of which is hereby incorporated by reference. The International Application claims priority to European Application No. 10190473.8 EP filed Nov. 9, 2010, the entire contents of which is hereby incorporated by reference.

FIELD OF INVENTION

The invention relates to a layer system having a number of ceramic layers.

BACKGROUND OF INVENTION

Ceramic thermal barrier coatings are often used in gas turbine technology for components that are subjected to high thermal loading, such as for example stationary and moving blades. This reduces the temperature of the metallic substrate and consequently increases the service life of the component.

Until now, yttrium-stabilized zirconium oxide or zirconia or pyrochlores has/have been used as the ceramic, the pyrochlores often having a layer of zirconia lying in between.

The thermal conductivity is further reduced by the porosity, so that the region of the highest temperature, that is to say the region of the outermost layer, has the highest porosity.

SUMMARY OF INVENTION

It is an object of the invention to further improve the service life of the ceramic layer or layers.

The object is achieved by a layer system according to the independent claim.

Further advantageous measures, which can be combined with one another as desired in order to achieve further advantages, are listed in the dependent claims.

BRIEF DESCRIPTION OF THE DRAWINGS

In the figures:
FIG. 5 shows a turbine blade,
FIG. 6 shows a combustion chamber,
FIG. 7 shows a list of superalloys.

DETAILED DESCRIPTION OF INVENTION

The figures and the description only represent exemplary embodiments of the invention.

Figure 1:
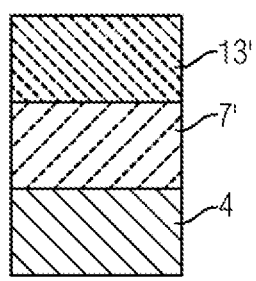
FIG. 1 shows a layer system according to prior art.

FIG. 1 shows the prior art. On a substrate 4 there is a lowermost zirconia layer 7', on which an outer pyrochlore layer 13' has been applied. The porosity of the $ZrO_2$ layer is less in comparison with the porosity of the outer layer 13'.

Figure 2:
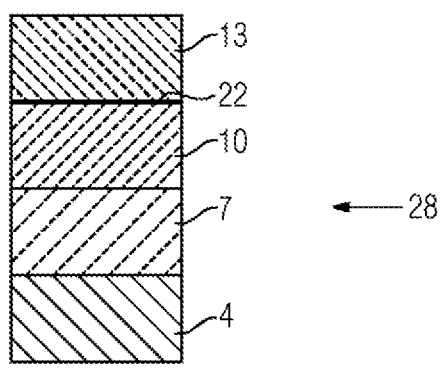
FIGS. 2, 3 show exemplary embodiments of the invention.

FIG. 2 shows a first exemplary embodiment of the invention. Only the ceramic layer component of a layer system is schematically shown.

The layer system has a substrate 4, which preferably comprises a nickel-based superalloy according to FIG. 7, and in particular consists thereof.

The substrate 4 may comprise a diffusion protection layer or an overlay layer (not represented any more specifically in the figures) of a metallic material/alloy for the prevention of corrosion and/or for the better bonding of the ceramic layer.

Preferably used here as the bonding layer for the ceramic is an MCrAl or MCrAlX alloy for forming an overlay layer (M=nickel (Ni) or cobalt (Co)).

An oxide layer (TGO) (not represented any more specifically in the figures) forms in advance, or at least during operation, on this overlay layer.

On the MCrAl or the MCrAl(X) layer or the bonding layer there is the ceramic layer system according to FIG. 2.

The lowermost ceramic layer region 7 is a zirconia layer that is partially stabilized preferably with yttrium oxide or yttria, preferably with 8% by weight of yttria.

The lowermost ceramic layer 7 is preferably applied by means of a thermal plasma spraying process, in particular APS or HVOF.

The lowermost ceramic layer has a porosity of preferably 12%+/−4%, in particular +/−2%.

On this lower ceramic layer 7, a further ceramic layer 10 is applied, preferably comprising the same material as the lower ceramic layer 7, that is to say yttria-stabilized zirconia, which however has a higher porosity, at 18%+/−4%, in particular +/−2%.

The outer, in particular outermost, ceramic layer 13 on the ceramic layer 10 has a pyrochlore structure, preferably of gadolinium zirconate or gadolinium hafnate, which has a porosity of preferably 15%+/−4%, in particular +/−2%, and is preferably likewise produced by means of APS or HVOF.

Figure 3:
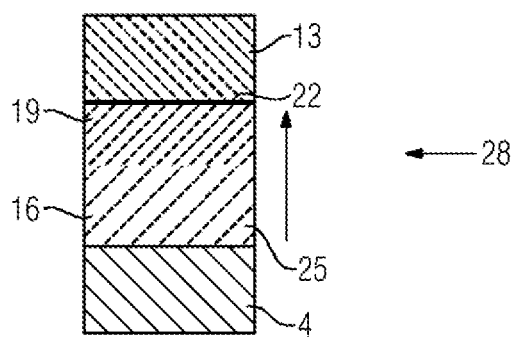

FIG. 3 shows a further exemplary embodiment of the invention. Here, the layers 7, 10 according to FIG. 2 represent a gradient layer 25, the porosity of 12%+/−4%, in particular +/−2%, increasing from the substrate 4 to the outer layer 13 up to (boundary region 22) 18%+/−4%, in particular +/−2%.

The greatest porosity is achieved at least in the boundary region 22 between the partially yttria-stabilized zirconia layer 25 and the pyrochlore structure 13.

The layers 25, 13 are preferably likewise produced by means of APS or HVOF.

This multilayer coating can be created in the normal production process, in which the thermal barrier coating is applied in a number of layers and application operations with a thickness of approximately 25 μm.

In this case, the porosity can be increased from the first coating layer.

The increased porosity achieves the effect of a lower thermal conductivity in comparison with the layer with minimal porosity. By graduation, that is to say by the gradient layer 25 or the two ceramic layers 7, 10, the thermal gradients between the MCrAl or MCrAlX alloy and the zirconia layer and between the zirconia layer and the pyrochlore structure are reduced. Since the thermal gradients may be a cause of the failure of the substrate, the service life is increased.

Differences in the porosities (FIGS. 2, 3) are generally preferably at least 10%, and are therefore significantly greater than production-induced differences in porosity.

In the coating of a component 120, 130, 155, the variations of the various desired porosities are the same, i.e. the intervals between the desired porosities of 12%, 18% and 15% remain virtually the same and change at most in a new coating on a different component.

Figure 4:
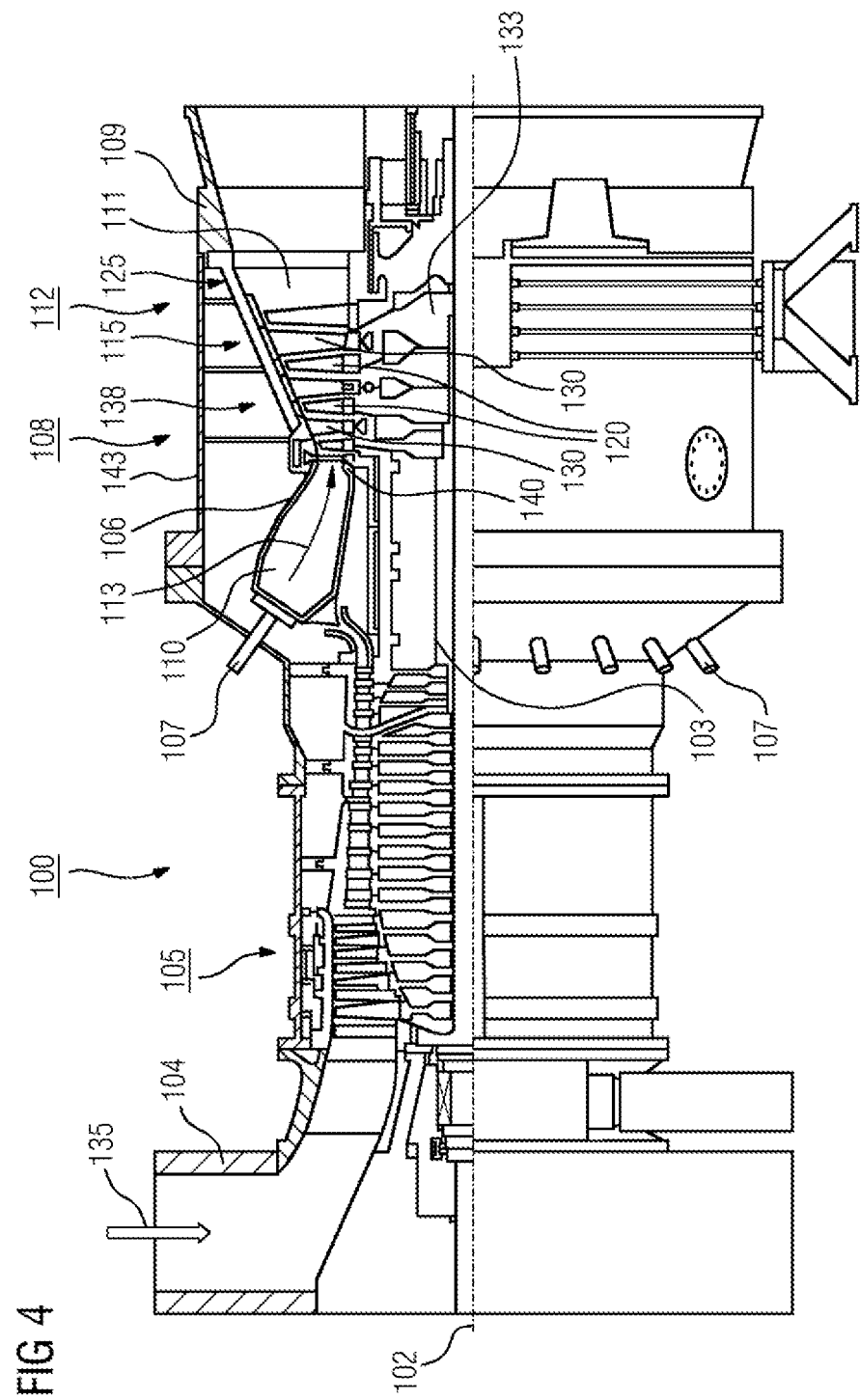
FIG. 4 shows a gas turbine.

FIG. 4 shows by way of example a gas turbine 100 in a longitudinal partial section.

The gas turbine 100 has in the interior a rotor 103 with a shaft 101, which is rotatably mounted about an axis of rotation 102 and is also referred to as a turbine runner.

Following one another along the rotor 103 are an intake housing 104, a compressor 105, a combustion chamber 110, for example toroidal, in particular an annular combustion chamber, with a number of coaxially arranged burners 107, a turbine 108 and the exhaust housing 109.

The annular combustion chamber 110 communicates with a hot gas duct 111, for example of an annular form. There, the turbine 108 is formed by four successive turbine stages 112, for example.

Each turbine stage 112 is formed, for example, by two blade rings. As seen in the direction of flow of a working medium 113, a row of stationary blades 115 is followed in the hot gas duct 111 by a row 125 formed by moving blades 120.

The stationary blades 130 are in this case fastened to an inner housing 138 of a stator 143, whereas the moving blades 120 of a row 125 are attached to the rotor 103, for example by means of a turbine disk 133.

Coupled to the rotor 103 is a generator or a machine (not represented).

During the operation of the gas turbine 100, air 135 is sucked in by the compressor 105 through the intake housing 104 and compressed. The compressed air provided at the end of the compressor 105 on the turbine side is passed to the burners 107 and mixed there with a fuel. The mixture is then burned in the combustion chamber 110 to form the working medium 113. From there, the working medium 113 flows along the hot gas duct 111 past the stationary blades 130 and the moving blades 120. At the moving blades 120, the working medium 113 expands, transferring momentum, so that the moving blades 120 drive the rotor 103 and the latter drives the machine coupled to it.

The components that are exposed to the hot working medium 113 are subjected to thermal loads during the operation of the gas turbine 100. The stationary blades 130 and moving blades 120 of the first turbine stage 112, as seen in the direction of flow of the working medium 113, are thermally loaded the most, along with the heat shielding elements lining the annular combustion chamber 110.

In order to withstand the temperatures prevailing there, these may be cooled by means of a coolant.

Similarly, substrates of the components may have a directional structure, i.e. they are monocrystalline (SX structure) or only have longitudinally directed grains (DS structure).

Iron-, nickel- or cobalt-based superalloys are used for example as the material for the components, in particular for the turbine blade 120, 130 and components of the combustion chamber 110.

Such superalloys are known, for example, from EP 1 204 776 B1, EP 1 306 454, EP 1 319 729 A1, WO 99/67435 or WO 00/44949.

Similarly, the blades 120, 130 may have coatings against corrosion (MCrAlX; M is at least one element of the group comprising iron (Fe), cobalt (Co) and nickel (Ni), X is an active element and represents yttrium (Y) and/or silicon, scandium (Sc) and/or at least one element of the rare earths, or hafnium). Such alloys are known from EP 0 486 489 B1, EP 0 786 017 B1, EP 0 412 397 B1 or EP 1 306 454 A1.

The thermal barrier coating, which consists for example of $ZrO_2$, $Y_2O_3$—$ZrO_2$, i.e. is unstabilized, partially stabilized or completely stabilized by yttrium oxide and/or calcium oxide and/or magnesium oxide, may also be present on the MCrAlX.

Columnar grains are produced in the thermal barrier coating by suitable coating methods, such as for example electron-beam physical vapor deposition (EB-PVD).

The stationary blade 130 has a stationary blade root (not represented here), facing the inner housing 138 of the turbine 108, and a stationary blade head, at the opposite end from the stationary blade root. The stationary blade head faces the rotor 103 and is fixed to a fastening ring 140 of the stator 143.

FIG. 5 shows in a perspective view a moving blade 120 or stationary blade 130 of a turbomachine, which extends along a longitudinal axis 121.

The turbomachine may be a gas turbine of an aircraft or of a power plant for generating electricity, a steam turbine or a compressor.

The blade 120, 130 has, following one after the other along the longitudinal axis 121, a fastening region 400, an adjoining blade platform 403 and also a blade airfoil 406 and a blade tip 415.

As a stationary blade 130, the blade 130 may have a further platform at its blade tip 415 (not represented).

In the fastening region 400 there is formed a blade root 183, which serves for the fastening of the moving blades 120, 130 to a shaft or a disk (not represented).

The blade root 183 is designed, for example, as a hammerhead. Other designs as a firtree or dovetail root are possible.

The blade 120, 130 has for a medium which flows past the blade airfoil 406 a leading edge 409 and a trailing edge 412.

In the case of conventional blades 120, 130, solid metallic materials, in particular superalloys, are used for example in all the regions 400, 403, 406 of the blade 120, 130.

Such superalloys are known, for example, from EP 1 204 776 B1, EP 1 306 454, EP 1 319 729 A1, WO 99/67435 or WO 00/44949.

The blade 120, 130 may in this case be produced by a casting method, also by means of directional solidification, by a forging method, by a milling method or combinations of these.

Workpieces with a monocrystalline structure or structures are used as components for machines which are exposed to high mechanical, thermal and/or chemical loads during operation.

The production of monocrystalline workpieces of this type takes place for example by directional solidification from the melt. This involves casting methods in which the liquid metallic alloy solidifies to form the monocrystalline structure, i.e. to form the monocrystalline workpiece, or in a directional manner.

Dendritic crystals are thereby oriented along the thermal flow and form either a columnar grain structure (i.e. grains which extend over the entire length of the workpiece and are commonly referred to here as directionally solidified) or a monocrystalline structure, i.e. the entire workpiece comprises a single crystal. In these methods, the transition to globulitic (polycrystalline) solidification must be avoided, since undirected growth necessarily causes the formation of transversal and longitudinal grain boundaries, which nullify the good properties of the directionally solidified or monocrystalline component.

While reference is being made generally to directionally solidified structures, this is intended to mean both monocrystals, which have no grain boundaries or at most small-angle grain boundaries, and columnar crystal structures, which indeed have grain boundaries extending in the longitudinal direction but no transversal grain boundaries. These second-mentioned crystalline structures are also referred to as directionally solidified structures.

Such methods are known from U.S. Pat. No. 6,024,792 and EP 0 892 090 A1.

Similarly, the blades 120, 130 may have coatings against corrosion or oxidation, for example (MCrAlX; M is at least one element of the group comprising iron (Fe), cobalt (Co) and nickel (Ni), X is an active element and represents yttrium (Y) and/or silicon and/or at least one element of the rare earths, or hafnium (Hf)). Such alloys are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermal grown oxide layer) forms on the MCrAlX layer (as an intermediate layer or as the outermost layer).

The composition of the layer preferably comprises Co-30Ni-28Cr-8Al-0.6Y-0.75Si or Co-28Ni-24Cr-10Al-0.6Y. Apart from these cobalt-based protective coatings, nickel-based protective coatings are also preferably used, such as Ni-10Cr-12Al-0.6Y-3Re or Ni-12Co-21Cr-11Al-0.4Y-2Re or Ni-25Co-17Cr-10Al-0.4Y-1.5Re.

A thermal barrier coating may also be present on the MCrAlX. The thermal barrier coating covers the entire MCrAlX layer.

Columnar grains are created in the thermal barrier coating by suitable coating methods, such as for example electron-beam physical vapor deposition (EB-PVD).

Other coating methods are conceivable, for example atmospheric plasma spraying (APS), LPPS, VPS or CVD. The thermal barrier coating may have grains which are porous, are provided with microcracks or are provided with macrocracks for better thermal shock resistance. The thermal barrier coating is therefore preferably more porous than the MCrAlX layer.

Refurbishment means that components 120, 130 may have to be freed of protective layers after use (for example by sandblasting). This is followed by removal of the corrosion and/or oxidation layers or products. If need be, cracks in the component 120, 130 are then also repaired. This is followed by recoating of the component 120, 130 and renewed use of the component 120, 130.

The blade 120, 130 may be hollow or be of a solid form. If the blade 120, 130 is to be cooled, it is hollow and may also have film cooling holes 418 (indicated by dashed lines).

FIG. 6 shows a combustion chamber 110 of a gas turbine. The combustion chamber 110 is designed for example as what is known as an annular combustion chamber, in which a multiplicity of burners 107, which produce flames 156 and are arranged in the circumferential direction around an axis of rotation 102, open out into a common combustion chamber space 154. For this purpose, the combustion chamber 110 is designed as a whole as an annular structure, which is positioned around the axis of rotation 102.

To achieve a comparatively high efficiency, the combustion chamber 110 is designed for a comparatively high temperature of the working medium M of approximately 1000° C. to 1600° C. To permit a comparatively long operating time even with these operating parameters that are unfavorable for the materials, the combustion chamber wall 153 is provided on its side facing the working medium M with an inner lining formed by heat shielding elements 155.

Each heat shielding element 155 of an alloy is provided on the working medium side with a particularly heat-resistant protective layer (MCrAlX layer and/or ceramic coating) or is produced from material that is resistant to high temperature (solid ceramic bricks).

These protective layers may be similar to the turbine blades, meaning for example MCrAlX: M is at least one element of the group comprising iron (Fe), cobalt (Co) and nickel (Ni), X is an active element and represents yttrium (Y) and/or silicon and/or at least one element of the rare earths, or hafnium (Hf). Such alloys are known from EP 0 486 489 B1, EP 0 786 017 B1, EP 0 412 397 B1 or EP 1 306 454 A1.

A thermal barrier coating which is for example a ceramic thermal barrier coating may also be present on the MCrAlX. Columnar grains are produced in the thermal barrier coating by suitable coating methods, such as for example electron-beam physical vapor deposition (EB-PVD).

Other coating methods are conceivable, for example atmospheric plasma spraying (APS), LPPS, VPS or CVD. The thermal barrier coating may have grains which are porous, are provided with microcracks or are provided with macrocracks for better thermal shock resistance.

Refurbishment means that heat shielding elements 155 may have to be freed of protective layers after use (for example by sandblasting). This is followed by removal of the corrosion and/or oxidation layers or products. If need be, cracks in the heat shielding element 155 are then also repaired. This is followed by recoating of the heat shielding elements 155 and renewed use of the heat shielding elements 155.

On account of the high temperatures in the interior of the combustion chamber 110, a cooling system may also be provided for the heat shielding elements 155 or for their holding elements. The heat shielding elements 155 are then for example hollow and, if need be, also have cooling holes (not represented) opening out into the combustion chamber space 154.

The invention claimed is:

1. A layer system with ceramic layers, comprising:
a lowermost zirconia layer,
an outer pyrochlore layer, and
a central zirconia layer between the lowermost zirconia layer and the outer pyrochlore layer,
wherein the lowermost zirconia layer has the lowest porosity of the layers,
wherein the central zirconia layer has the highest porosity of the layers, and
wherein the outer pyrochlore layer has an intermediate porosity between that of the lowermost zirconia layer and the central zirconia layer.

2. The layer system as claimed in claim 1, wherein:
the lowermost zirconia layer is an yttria-stabilized zirconia layer, and
the central zirconia layer is an yttria-stabilized zirconia layer.

3. The layer system as claimed in claim 1, wherein the central zirconia layer has a porosity of 18%+/−2%.

4. The layer system as claimed in claim 1, wherein the lowermost zirconia layer has a porosity of 12%+/−2%.

5. The layer system as claimed in claim 1, wherein the outer pyrochlore layer has a porosity of 15%+/−2%.

6. The layer system as claimed in claim 1, wherein the layer system comprises only three ceramic layers.

7. The layer system as claimed in claim 1, further comprising:
a metallic bonding layer below the lowermost zirconia layer for bonding of the layer system to a substrate, and
an oxide layer on the bonding layer below the lowermost zirconia layer.

8. The layer system as claimed in claim 1, wherein a difference in porosities
between the lowermost zirconia layer and the central zirconia layer and/or
between the central zirconia layer and the outer pyrochlore layer and/or
between the lowermost zirconia layer and the outer pyrochlore layer
is at least 10%.

9. The layer system as claimed in claim 1, wherein the pyrochlore layer comprises gadolinium zirconate or gadolinium hafnate.

10. The layer system as claimed in claim 9, wherein the pyrochlore layer consists of gadolinium zirconate or gadolinium hafnate.

11. The layer system as claimed in claim 1, wherein the zirconia layers are produced by atmospheric plasma spraying (APS) or high velocity oxygen fuel spraying (HVOF).

* * * * *